J. L. Dutton,
8833X
Sawing Stone.
Patented May 22, 1835.
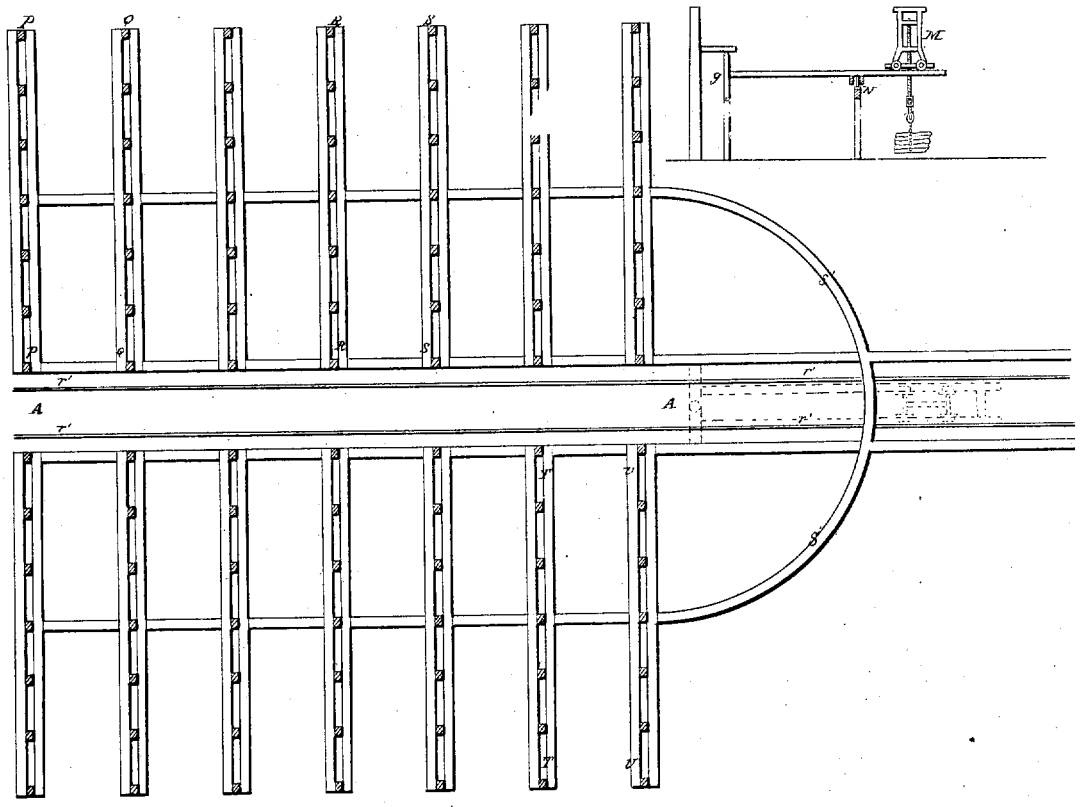
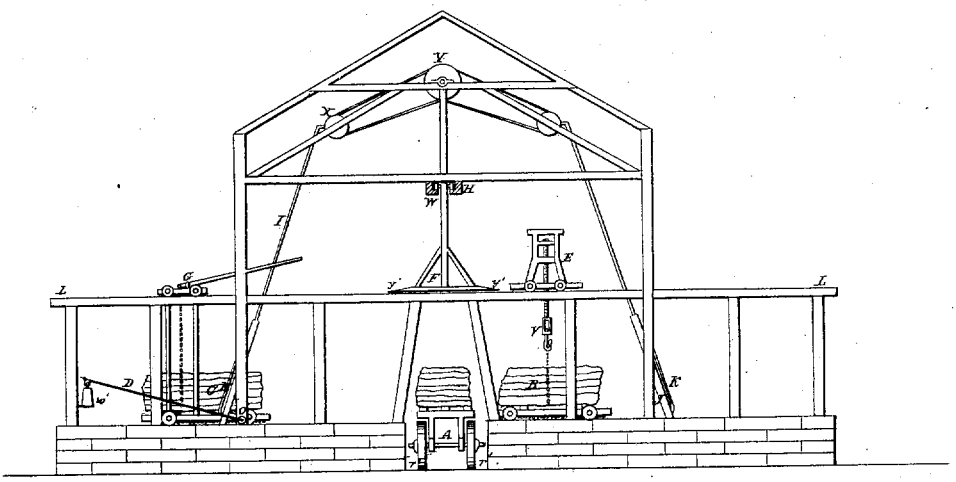
AM. PHOTO-LITHO. CO. N.Y. (OSBORNE'S PROCESS)

May 22. 1835

Joseph L. Dutton 8833X
Letters Patent

The schedule referred to in these Letters Patent and making part of the same containing a description in the words of the said Joseph L. Dutton himself of his improvement in Stone Sawing Mills

---

To all to whom these presents shall come: Be it known that I Joseph L. Dutton of the City of Philadelphia in the County of Philadelphia and state of Pennsylvania have invented new and useful improvements in Mills for sawing Stone and that the within is a full and exact description of the construction and operation of said mill as improved by me. Specification of an improved Saw mill invented by Joseph L. Dutton of Philadelphia. The improvements are as follows. Instead of placing the floor of the Mill on a <u>level</u> with the ground as usual I raise it so far above as to be on a line with the bed of the log or marble teams by which many most of the expense incurred by unloading and reloading is saved on this elevated floor are placed several short transverse railways upon which run the cars B & C, to which the blocks & Stone are transferred immediately from the common teams and by which they are supported during the operation of sawing. In the plan P.P. and Q.Q. represent one set of railways and R.R., S.S. &c other sets. The removing the blocks from the teams to the rail way cars B. & C. is effected by means of an endless screw turned by proper cranks and pinion work framed on a car E. which traverses the elevated rails L.L. &c placed directly over those on which the block cars run. At the lower end of the screw is a swivel V which allows the block to be turned round horizontally: only one screw car is necessary for all the setts of railway being carried from one to another on the suspended frame F. along which it may be pushed from one end of the building to the other on the rollers H.H. The lower part of this suspended frame plays a few inches vertically on a pivot at W. which allows either end Y. Y. as required to come into contact with the floor L.L. so as to form an inclined plane for greater ease in running the frame F on it. J.J. shew the saw slides in which the saws move in a nearly vertical direction

8833X direction (which motion has already been patented and has been found great-
ly preferable to the horizontal owing to the ease of supplying the sand and also
of the diminished friction on the saw blades which are delivered from the weight
of the block as it separates into slabs) I. is the pitman through which motion
is communicated to the saws by the wheels and bands X.Y. which are operat-
ed on by any convenient prime mover. The block of stone C is kept con-
stantly pressed against the saw by means of the lever D. at the end of which
is hung a weight W. of proper size for the purpose which may be moved back
wards and forwards as on a common steel yard. Near the other end is a ratch-
et which permits the lever to be raised without causing the pinion O. to re-
volve, but which in descending catches the teeth of the pinion which in
turn engages those of a rack bar placed under the centre of the block car
and thus maintains a continual pressure of the block against the saw
blade. To prevent this pressure from becoming at any time too great each
saw slide is furnished with a strong wooden spring K. which by yielding
when the weight W. operates too strongly preserves a proper degree of pressure.
The stiffness of this spring must of course be capable of adjustment. For ease
of moving blocks and commanding a large space of yard I employ a crane
whose turning point may be at G as usual but whose stay traverses (either
by means of rollers at N. or in any other manner convenience may direct)
railways of semicircular form which may be arranged as shewn in plan
by SS. and by the dotted lines or otherwise. On the top of the crane travels
a screw car (like that at E) for lifting blocks from the ground and plac-
ing them either in another part of the yard or on a railway car by which
they may be carried into or out of the mill on the railway R.R. of common
construction. By this crane any extent of yard may be commanded.
What I claim as new and for which I claim an exclusive right are the
raising of the mill floor as above described. the traversing car F. the applica
tion of the upper car E to saw mills. the car G. The crane whether applied
to saw mills or for any other purpose and the regulating spring of the saw
slides Witnesses
Simeon Mason
William Milnor (Drawing.)

Joseph L. Dutton

915 [illegible]

[illegible]
[illegible]